United States Patent
Katz et al.

(10) Patent No.: US 10,406,513 B2
(45) Date of Patent: Sep. 10, 2019

(54) METHOD FOR THE CONVERSION OF NITROUS ACID TO DINITROGEN GAS

(71) Applicant: Memorial University of Newfoundland, St. John's (CA)

(72) Inventors: Michael Katz, St. John's (CA); Cora Young, St. John's (CA); Trevor VandenBoer, St. John's (CA); Michaela Deborah Ryan, Conception Bay South (CA); John Joseph MacInnis, Frenchvale (CA)

(73) Assignee: Memorial University of Newfoundland, St. John's, Newfoundland (CA)

( * ) Notice: Subject to any disclaimer, the term of this patent is extended or adjusted under 35 U.S.C. 154(b) by 0 days.

(21) Appl. No.: 15/611,997

(22) Filed: Jun. 2, 2017

(65) Prior Publication Data

US 2017/0348682 A1 Dec. 7, 2017

Related U.S. Application Data

(60) Provisional application No. 62/345,138, filed on Jun. 3, 2016.

(51) Int. Cl.
| | |
|---|---|
| B01J 31/16 | (2006.01) |
| B01J 31/22 | (2006.01) |
| B01D 53/86 | (2006.01) |
| B01D 53/54 | (2006.01) |
| B01D 53/82 | (2006.01) |

(52) U.S. Cl.
CPC .......... *B01J 31/1691* (2013.01); *B01D 53/54* (2013.01); *B01D 53/82* (2013.01); *B01D 53/8621* (2013.01); *B01J 31/2239* (2013.01); *B01D 2253/204* (2013.01); *B01D 2255/2092* (2013.01); *B01D 2255/20707* (2013.01); *B01D 2255/20715* (2013.01); *B01D 2255/705* (2013.01); *B01D 2257/40* (2013.01); *B01J 2231/62* (2013.01); *B01J 2531/004* (2013.01); *B01J 2531/0211* (2013.01); *B01J 2531/0222* (2013.01); *B01J 2531/31* (2013.01); *B01J 2531/46* (2013.01); *B01J 2531/48* (2013.01); *B01J 2531/49* (2013.01)

(58) Field of Classification Search
None
See application file for complete search history.

(56) References Cited

U.S. PATENT DOCUMENTS

2010/0065442 A9 * 3/2010 Saffell .................. G01N 27/404
　　　　　　　　　　　　　　　　　　　　　　　　　205/785.5
2012/0129684 A1 * 5/2012 Vimont .............. B01D 53/8628
　　　　　　　　　　　　　　　　　　　　　　　　　502/170
2017/0072070 A1 * 3/2017 Sada ...................... A61K 47/32

FOREIGN PATENT DOCUMENTS

WO　　　2015170506　　* 11/2015

OTHER PUBLICATIONS

Heylen, et al. "Temperature Swing adsorption of NOx . . . " Energy Environ Sci. 3, 910-916 (2010). (Year: 2010).*
Ebrahim, Amani "Doping of Metal Organic Framework . . . ". CUNY. Master's Thesis. (2013). (Year: 2013).*
Ebrahim "Interactions of NO2 . . . ". Langumuir. CUNY, 29, 168-174. (2013). (Year: 2013).*
Katz, M. J. et al. A facile synthesis of UiO-66, UiO-67 and their derivatives. Chem. Commun. 49, 9449-9451, doi:10.1039/c3cc46105j (2013).
MacInnis, J. J., VandenBoer, T. C. & Young, C. J. Development of a gas phase source for perfluoroalkyl acids to axamine atmospheric sampling methods. Analyst, 10.1039/C1036AN00313C (2016).
Febo, A., Perrino, C., Gherardi, M. & Sparapani, R. Evaluation of a High-Purity and High-Stability Continuous Generation System for Nitrous Acid. Environ. Sci. Technol. 29, 2390-2395, doi:10.1021/es00009a035 (1995).
Serinus 44 Ammonia & Oxides of Nitrogen Analyser User Manual Version 3.0. Ecotech Serinus 44 Ammonia & Oxides of Nitrogen Analyser User Manual Version 3.0.
Han, C., Yang, W., Wu, Q., Yang, H. & Xue, X. Heterogeneous Photochemical Conversion of NO2 to HONO on the Humic Acid Surface under Simulated Sunlight. Environ. Sci. Technol. 50, 5017-5023, doi:10.1021/acs.est.5b05101 (2016).
VandenBoer, T. C. et al. Nocturnal loss and daytime source of nitrous acid through reactive uptake and displacement. Nature Geosci 8, 55-60, doi:10.1038/ngeo2298 http://www.nature.com/ngeo/journal/v8/n1/abs/ngeo2298.html#supplementary-information (2015).
VandenBoer, T. C. et al. Understanding the role of the ground surface in HONO vertical structure: High resolution vertical profiles during NACHTT-11. J. Geophys. Res.: Atmos. 118, 10,155-110,171, doi:10.1002/jgrd.50721 (2013).
Peterson, G.W., Mahle, J.J., DeCoste, Gordon, W.O., and Rossin, J.A. Extraordinary NO2 Removal by the Metal-Organic Framework UiO-66-NH2. Angew. Chem. 2016, 128, 1-5.
Michaela Ryan. The Use of Metal-Organic Frameworks for the Sensing and Sequestration of HONO. Chem 490B Honours Presentation. Memorial University of Newfoundland. Mar. 23, 2016.

* cited by examiner

*Primary Examiner* — Sheng H Davis
(74) *Attorney, Agent, or Firm* — Bereskin & Parr LLP/S.E.N.C.R.L.; Michael Fenwick

(57) ABSTRACT

The present application is directed to a method for the conversion of nitrous acid to dinitrogen gas. In particular, the present application relates to a method for the conversion of nitrous acid to dinitrogen gas by contacting the nitrous acid with an amine-functionalized metal organic framework.

14 Claims, 6 Drawing Sheets

(A)

(B)

(C)

METHOD FOR THE CONVERSION OF NITROUS ACID TO DINITROGEN GAS

FIELD

The present application is directed to a method for the conversion of nitrous acid to dinitrogen gas. In particular, the present application relates to a method for the conversion of nitrous acid to dinitrogen gas by contacting the nitrous acid with an amine-functionalized metal organic framework.

INTRODUCTION

Air quality monitoring is of great importance in order to understand how pollutants migrate and react in the environment (i.e., their life cycle). In addition, in order to limit any reprotoxicity and end-of-life issues, it is important to be able to find methods of eliminating these pollutants from high pollution areas (e.g., homes, cities, cars, tunnels). The challenges associated with these sensing and sequestering issues are numerous given the existence of several persistent pollutants (e.g., $NO_x$, $SO_x$, and $O_x$) coupled with the varying chemistry associated between pollutant and sensor/adsorbent. One such transient pollutant is nitrous acid ($HNO_2$, or more accurately HONO). HONO is a ubiquitous environmental pollutant. Ambient atmospheric HONO is produced via the reaction of $NO_2$ on wet surfaces at night in polluted urban environments. Primary sources of $NO_2$, and also HONO, are combustion and exhaust. Currently, the only method by which HONO can be quantitatively analyzed is by trapping it in basic aqueous media, resulting in an unstable nitrite ion, or through the use of very expensive instrumentation. These approaches are limited, respectively, as nitrite can chemically transform to other nitrogen oxides, and cutting-edge instrumentation is not easily implemented for simple monitoring. Thus, although sensing and sequestering HONO is important, the field is limited by which this can be easily and efficiently done.

SUMMARY

The present application is directed to a method for the conversion of nitrous acid to dinitrogen gas. In particular, the present application relates to a method for the conversion of nitrous acid to dinitrogen gas by contacting the nitrous acid with an amine-functionalized metal organic framework.

Accordingly, in one embodiment of the disclosure there is included a method for converting nitrous acid (HONO) to dinitrogen gas ($N_2$), the method comprising:
 (i) providing an amine-functionalized metal organic framework (MOF); and
 (ii) contacting the metal organic framework with HONO.

In another embodiment, the amine-functionalized MOF reacts with HONO in order to facilitate the decomposition of HONO to $N_2$.

The present disclosure also includes a method for detecting the presence of HONO, the method comprising:
 (i) contacting an amine-functionalized metal organic framework with a sample; and
 (ii) detecting whether HONO is present in the sample using a spectroscopic technique.

In one embodiment, the determination of whether HONO is present in the sample is detected by the appearance of a hydroxyl group signal (or disappearance of the amine signal), meaning the amine group of the MOF has been converted to an OH group by reacting with HONO.

The present disclosure also includes a method for the sequestration of HONO, the method comprising:
 (i) providing a metal organic framework (MOF); and
 (ii) contacting the metal organic framework with a HONO-containing stream wherein the MOF sequesters or absorbs the HONO.

Other features and advantages of the present disclosure will become apparent from the following detailed description. It should be understood, however, that the detailed description and the specific examples while indicating preferred embodiments of the disclosure are given by way of illustration only, since various changes and modifications within the spirit and scope of the disclosure will become apparent to those skilled in the art from this detailed description.

DRAWINGS

The present disclosure will now be described in greater detail with reference to the following drawings in which.

DESCRIPTION OF VARIOUS EMBODIMENTS

Definitions

Figure 1:
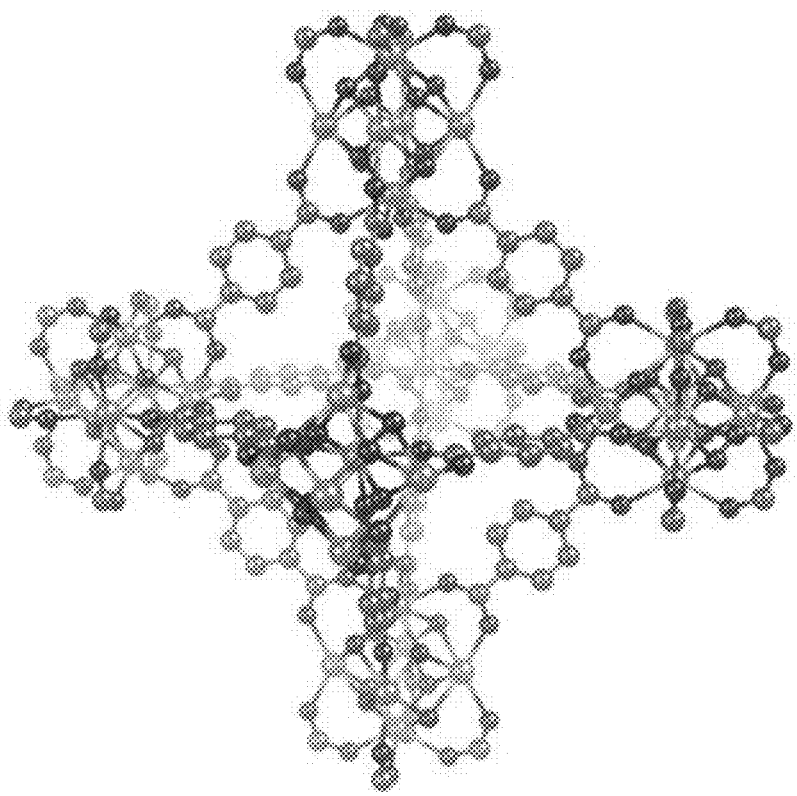
FIG. 1 is a truncated crystal structure of a metal organic framework.

The term "metal-organic framework," abbreviated "MOF" as used herein, refers to porous structures or materials in which metal clusters are joined by multi-dentate or poly-functional organic ligands.

The term "amine-functionalized" as used herein refers to derivatives of metal organic frameworks modified to incorporate or contain a functional group comprising at least one amine group. The term "amine" as used herein refers to a functional group comprising at least one NR'R" group, wherein R' and R" include, but are not limited to, H and alkyl, or aromatic substituents.

The term "metal node" as used herein refers to any metal containing moiety present in a metal-organic framework of the disclosure, and includes single metal atoms or metal ions and groups of metals or metal ions that optionally include ligands or covalently bonded groups.

The term "multi-dentate linking ligands" as used herein refers to organic moieties or structures which bond to and join adjacent metal nodes.

Method for Converting Nitrous Acid

The present application is directed to a method for the conversion of nitrous acid to dinitrogen gas. In particular, the present application relates to a method for the conversion of nitrous acid to dinitrogen gas by contacting the nitrous acid with an amine-functionalized metal organic framework, which catalyzes the reaction of nitrous acid to nitrogen gas.

Accordingly, in one embodiment of the disclosure there is included a method for converting nitrous acid (HONO) to dinitrogen gas ($N_2$), the method comprising:
(i) providing an amine-functionalized metal organic framework (MOF); and
(ii) contacting the metal organic framework with HONO.

In one embodiment, the metal organic framework catalyzes the reaction of HONO to nitrosonium ion ($NO^+$). In another embodiment, the metal organic framework further catalyzes the reaction of $NO^+$ to $N_2$. In a further embodiment, the HONO is gaseous HONO. Without being bound by theory, the gaseous nitrous acid is converted to $NO^+$ within the metal-organic framework by the metal nodes. The Sandemeyer reaction is well known to those skilled in the art in which aqueous $NaNO_2$ is converted in acidic solution to HONO. Additional acid-solution catalysis converts HONO to $NO^+$. The Sandemeyer reaction requires solution-phase acid catalysis. In one embodiment of the disclosure, HONO is surprisingly catalyzed to $NO^+$ in the gaseous phase in the metal-organic framework in the absence of external catalysts such as an acid or irradiation. In another embodiment, the $NO^+$ formed in situ in the metal-organic framework is subsequently catalyzed to dinitrogen gas. Accordingly, in one embodiment, the metal-organic frameworks of the present disclosure catalyze the reaction of HONO to $N_2$ in the absence of external catalysts.

In one embodiment, the amine-functionalized metal organic framework is functionalized with at least one NR'R", where R' and R" are independently or simultaneously H, ($C_1$-$C_{20}$)-alkyl or ($C_6$-$C_{10}$)-aryl. In one embodiment, R' and R" are independently or simultaneously H, ($C_1$-$C_{10}$)-alkyl or phenyl. In another embodiment, R' and R" are independently or simultaneously H or ($C_1$-$C_4$)-alkyl. In another embodiment, the metal organic framework is functionalized with at least one $NH_2$ group.

In another embodiment of the disclosure, the metal organic framework comprises:
(i) a plurality of metal nodes; and
(ii) a plurality of multi-dentate linking ligands that connect adjacent metal nodes.

In one embodiment, the metal nodes comprise a metal containing moiety. In one embodiment, the metal containing moiety comprises single metal atoms or metal ions and groups of metals or metal ions that optionally include ligands or covalently bonded groups. In one embodiment, the metal node comprises a group of the formula $M_w(O)_x(OH)_y$, where M is any suitable metal such as titanium, hafnium, zirconium or aluminum, wherein w is 6, x is 4, and y is 4.

In one embodiment, the metal node comprises $Zr_6O_4(OH)_4$. In a further embodiment, the $Zr_6O_4(OH)_4$ is formed in situ from hydrolysis of $ZrCl_4$.

In another embodiment of the disclosure, the multidentate linking ligand comprises an organic moiety or structure which bonds to and joins adjacent metal nodes. The multi-dentate linking ligand is any ligand, compound or structure which can join two or more metal nodes together. In another embodiment, the multidentate linking ligand comprises 1,4-benzenedicarboxylate, terphenyl-4,4'-dicarboxylate or biphenyl-4,4'-dicarboxylate. In another embodiment, the multidentate linking ligand comprises 1,4-benzenedicarboxylate.

In another embodiment, the multidentate linking ligand is functionalized with an amino group. In another embodiment, the multidentate linking ligand is

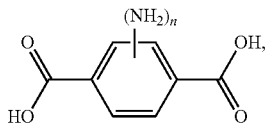

wherein n is 1 or 2.

In another embodiment, the multidentate linking ligand is

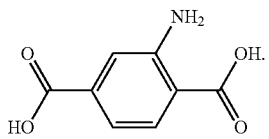 [SMILES: Nc1cc(C(=O)O)ccc1C(=O)O]

In another embodiment, the multidentate linking ligand is bound or coordinated to the metal nodes through the oxygen atoms

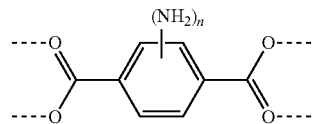

Figure 2:
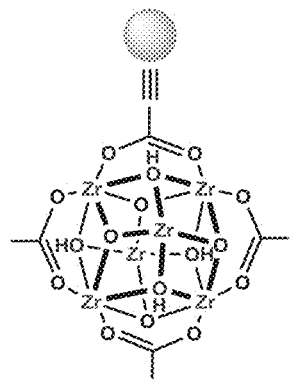
FIG. 2 is a schematic representation of a metal organic framework showing a metal node (A), a linker (B) and an amine-functionalized linker (C)
Figure 2:
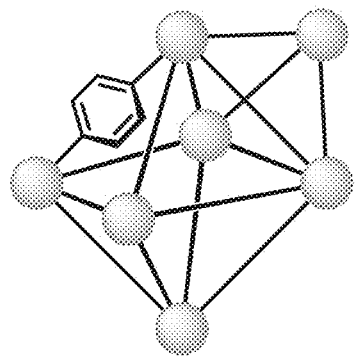
Figure 2:
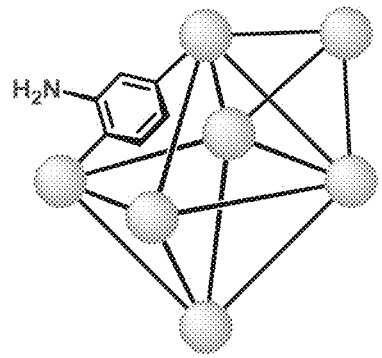

In another embodiment, the metal-organic framework is amine-functionalized UiO-66 (or UiO-66-$NH_2$). FIG. 1 shows a truncated crystal structure of UiO-66 showing one octahedral pore. The octahedral pores edge share to one another thereby leaving a face-sharing tetrahedral pore as well. FIG. 2 shows a schematic representation of a metal organic framework comprising a metal node (A) and linkers (B), wherein one of the linkers is amine-functionalized (C). In particular, FIG. 2 shows the node structure (A) (only 4 of the 12 carboxylate linkers are shown) of UiO66 and UiO-66-$NH_2$. The representation of UiO-66 shows how linkers link neighbouring nodes (B); a single octahedral pore (which edge-share to one another) and tetrahedral pore (which face-shares octahedral pores) is shown for clarity. Schematic representation of UiO-66-$NH_2$ which shows the functionalization of one of the linkers with an $NH_2$ moiety (C).

In one embodiment, and without being bound by theory, the amine functional group of the metal organic framework reacts with $NO^+$ to form a diazonium moiety [(—$N_2$)$^+$] on the metal organic framework (specifically on the multidentate linking ligand), which further reacts with gaseous water to release dinitrogen gas ($N_2$).

The present disclosure also includes a method for detecting the presence of HONO, the method comprising:
(i) contacting an amine-functionalized metal organic framework with a sample; and
(ii) detecting whether HONO is present in the sample using a spectroscopic technique.

The detection of HONO in the sample is determined by whether the amine group of the MOF has been converted to an OH group on the linker of the MOF. In another embodiment, the detection of HONO is determined by the absence or reduction of an amino, or by the corresponding increase in a hydroxyl signal. In one embodiment, the spectroscopic/spectrometric technique is infrared (IR), Raman, fluorescence, Nuclear Magnetic Resonance (NMR), Mass spectrometry (MS), or X-ray diffraction/scattering techniques. For example, in one embodiment, the spectroscopic technique is infrared, which detects the loss of the amine group on the MOF, or detects the appearance or presence of hydroxyl groups (—OH) in the MOF as a function of time. In another embodiment, the spectroscopic technique is $^1$H-NMR, wherein the MOF is dissolved in concentrated acid, and detection of whether HONO was present in the sample is determined by the presence of an —OH signal or a —$N_2^+$ on the benzene ring of the linker, and corresponding loss of an amino signal. Alternatively, in another embodiment, an internal standard ligand (such as benzenedicarboxylate) is used as an innocent linker for the NMR analysis/integration. In a further embodiment, the spectroscopic technique is fluorescence spectroscopy or Raman spectroscopy in which the loss of the amino signal corresponds to an increased —OH signal.

In one embodiment, the methods of the disclosure are also useful to detect the absence of HONO. In another embodiment, for other established instrumentation that measure HONO, the ability to sequester HONO quantitatively using the methods of the present disclosure, allows for artificial signals generated by other instrumentation samples to be corrected, and therefore measure HONO more accurately. Examples would include chemical ionization mass spectrometry, long path absorption photometers, and similar instrumentation monitoring the gas or condensed phases of atmospheric samples.

In another embodiment, the sample comprises any sample which may contain nitrous acid, and includes environmental or atmospheric samples (for example, combustion or exhaust samples), indoor air samples, laboratory-generated samples etc., or any other sample for which is it desired to determine the presence of nitrous acid. In another embodiment, the sample is a gaseous sample.

The present disclosure also includes a method for the sequestration (or absorption) of HONO, the method comprising:
  (i) providing a metal organic framework (MOF); and
  (ii) contacting the metal organic framework with a HONO-containing stream wherein the MOF sequesters HONO.

In another embodiment, the metal-organic framework captures or scrubs the HONO from the HONO-containing stream. In one embodiment, the HONO-containing stream is from a combustion or exhaust source, such as power plants, industries, cars, trucks, airplanes, etc. Other HONO containing streams include atmospheric, indoor, and laboratory gas samples. Other possibilities include air purged from/through other phases (liquid, solid) or matrices (e.g. soil, sewage sludge) whereby HONO could be entrained in the air flow through those media.

In another embodiment, the metal organic framework is an amine-functionalized MOF as defined in any of the preceding paragraphs. In one embodiment, when the MOF is an amine-functionalized MOF, the sequestered or captured HONO is converted to $N_2$ as described above.

In another embodiment, the metal organic frameworks have pores which trap the HONO thereby sequestering HONO within the porous structure of the metal organic framework. In one embodiment, when the MOF does not comprise amine groups, the HONO is sequestered within the pores of the MOF and is not converted to $N_2$.

In another embodiment, the methods for converting and/or sequestering HONO are used in conjunction with photochemical paints containing $TiO_2$. Paints containing $TiO_2$ are used to convert nitrogen dioxide ($NO_2$) into HONO. Accordingly, when used in conjunction with the methods of the present disclosure, nitrogen dioxide is converted into HONO and then either sequestered and/or converted into dinitrogen gas using the methods of the disclosure.

The present disclosure also includes a device for converting HONO to $N_2$, for monitoring HONO or for sequestering (or capturing or absorbing) HONO. In one embodiment, the device comprises a housing which contains a metal organic framework as defined herein. In one embodiment, the device converts HONO to $N_2$ and comprises a housing wherein an amine-functionalized MOF is contained within. In operation, a stream (for example, polluted air, exhaust, laboratory samples etc) containing HONO flows through the device wherein HONO contained in the stream is converted to $N_2$ by the amine-functionalized MOF within the device, thereby releasing $N_2$.

In another embodiment, the device sequesters, captures or absorbs HONO and comprises a housing wherein an MOF as defined herein is contained within the housing. In operation, a stream containing HONO flows through the device wherein HONO in the stream is captured, sequestered or absorbed by the MOF. In one embodiment, when the MOF is an amine-functionalized MOF, the HONO is captured and then converted to $N_2$.

In another embodiment, the device detects the presence (or absence) of HONO and comprises a housing wherein an amine-functionalized MOF as defined herein is contained within the housing of the device. In operation, a stream flows through the device and any HONO present in the stream is converted to $N_2$, by the corresponding conversion of the amine groups on the MOF to hydroxyl groups. The outgoing stream from the device can be analyzed for the presence or absence of HONO indicating the presence or absence of HONO. In another embodiment, the MOF within the housing is analyzed using spectroscopic methods to determine the decrease or absence of amine signals to determine the presence of HONO.

The following non-limiting examples are illustrative of the disclosure:

EXAMPLES

Example 1: Preparation of Metal Organic Frameworks

UiO-66 and its derivatives were all synthesized using the same procedure by Katz et al.[1] Each MOF was synthesized in 25 mL Duran® glass bottles. Initially, 125 mg (0.54 mmol) of $ZrCl_4$ was dissolved via sonication in 5 mL of N,N-dimethylformamide (DMF) and 1 mL of conc. HCl. For UiO-66, 125 mg (0.76 mmol) of terephthalic acid was added followed by an additional 10 mL of DMF. Once dissolved, the reaction was transferred to an oven at 80° C. overnight. A white precipitate formed overnight. After cooling the reaction, the reaction was centrifuged (5000 rpm for 5 min) and the DMF was replaced with fresh DMF (3×15 mL) in order to remove any unreacted starting materials. Subsequently, the DMF was similarly replaced with MeOH (3×15 mL). Finally, the solvent was decanted and the MOF was allowed to air dry. For UiO-66-$NH_2$, and UiO-66-OH, 130 mg (0.72 mmol) and 135 mg (0.74 mmol) were used for the aminoterephthalic and hydroxyterephthalic acid respectively. UiO-66 and UiO-66-OH were observed to be white powders while UiO-66-$NH_2$ was observed to be yellow. UiO-66-$NH_2$ has shown a colour change over time which may indicate that it is light-sensitive. To that end, UiO-66-$NH_2$ was wrapped in aluminium foil and stored in a dark drawer.

Example 2: HONO Measurements

Figure 3:
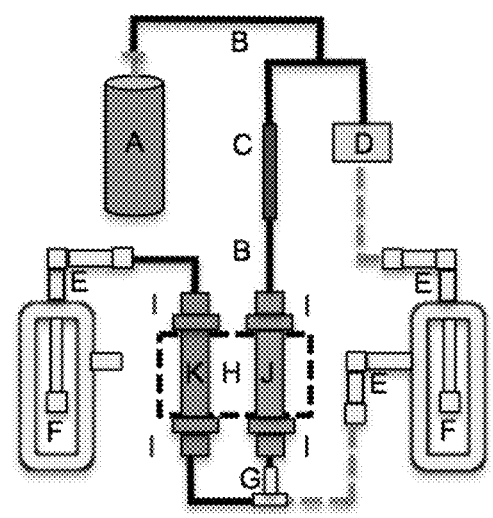
FIG. 3 shows a schematic representation of equipment for the gas phase generation of HONO.

In order to examine the proposed solid-gas phase reaction between UiO-66-NH$_2$ and HONO, gas phase HONO is generated in the lab through instrumentation modelled after the work of Febo et al. (as shown in FIG. 3).[2,3] The schematic in FIG. 3 shows the HONO gas phase source: (A) compressed dinitrogen cylinder; (B) ¼" polyethylene tubing; (C) Swagelok® VCR assembly with Lennox Laser 1 µm critical orifice held between the two stainless steel glands; (D) mass flow controller; (E) aluminum heating block; (F) ⅛-¼" PTFE elbow; (G) glass impinger; (H) ⅛" PTFE tee; (I) ⅛-½" PTFE union; (J) ½" PFA tubing housing an acid permeation device; (K) ½" PFA tubing housing a nitrite salt bed (NaNO$_2$).

The generation of gas phase HONO is based on acid displacement, whereby gaseous hydrochloric acid (HCl) is used to displace HONO from humidified solid sodium nitrite (NaNO$_2$). In the current design, dinitrogen (N$_2$) was used as the carrier gas and split into two channels (FIG. 3). In one channel (component C, FIG. 3) the flow of N$_2$ was regulated to a flow of 33 standard cubic centimeters per minute (sccm) using a critical orifice. The flow was directed into a thermostated aluminum heating block, which housed an HCl acid permeation device. The acid-entrained flow of N$_2$ was mixed with humidified N$_2$ to 50% relative humidity from the second channel (component E, FIG. 3) and passed over a NaNO$_2$ salt bed also housed in the thermostated aluminum block. A mass flow controller was used to regulate the N$_2$ from the compressed gas cylinder to 33 sccm into a glass impinger containing deionized water to control the water content for optimal HONO production, as discussed in Febo et al.[3] The mass emission rate of the HONO permeation source was determined by bubbling the output through 1 mM KOH followed by analysis of nitrite by anion-exchange chromatography (IC). The separation was performed using a ThermoScientific ICS-2100 fitted with AS11-HC guard and analytical columns, a KOH eluent generator system (EGC-III), running a gradient elution program at 30° C. and a mobile phase flow of 1.2 mL min$^{-1}$, followed by suppressed conductivity detection.

Example 3: Quantification of HONO in MOF Breakthrough Experiments

To determine breakthrough of HONO for MOFs, a MOF packed into a ¼ inch polyethylene tube between two plugs of glass wool, was connected to the HONO source. HONO was passed through the MOF and any remaining HONO was bubbled into 1 mM KOH, followed by IC, or the HONO was indirectly measured using an American Ecotech *Serinus* 44 Ammonia & Oxides of Nitrogen Analyser instrument (see below).

Example 4: High and Low HONO Mixing Ratio Breakthrough IC Experiments

Both high and low HONO mixing ratio experiments were carried out using the previously described instrumentation. The only variation between the two types of experiments was the concentration of HCl in the permeation tubes; in the dilute experiment, 2.5 M was used while the concentrated experiments used 12 M. For low mixing ratio experiments, 10 mg of MOF was exposed to a 650 ppbv (0.08 ng min$^{-1}$) HONO flow for 14 days. For high mixing ratio experiments, 50 mg of MOF was exposed to a 28 ppmv (3.65 ng min$^{-1}$) flow of HONO for 10 days. Collections of HONO into KOH were made prior to and/or after breakthrough experiments and quantified by IC to determine the amount of HONO breakthrough over the experiment duration by comparison to a sample collected for the duration of the MOF exposure. Since the mixing ratios used for these high-concentration experiments are well above those found in polluted indoor and outdoor environments, further experiments (see below) were performed where HONO exiting the MOF was diluted and then measured in real-time to account for losses of HONO by self-reaction on surfaces:

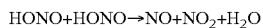

$$HONO+HONO \rightarrow NO+NO_2+H_2O$$

Figure 4:
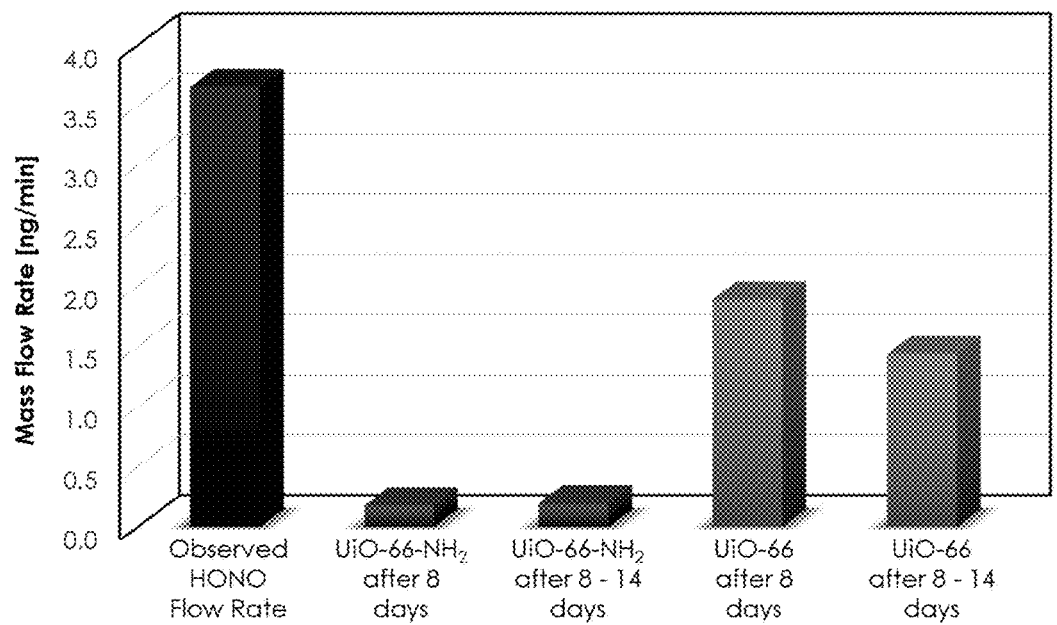
FIG. 4 is a graph showing the calculated downstream HONO mass-flow rates after contact with a metal organic framework in a method of the disclosure.

FIG. 4 shows the calculated downstream HONO mass-emission rates from the sample chamber as determined by IC. In the absence of any MOF material, a mass-emission rate of ca. 3.5 ng min$^{-1}$ was observed. In the presence of UiO-66-NH$_2$, the calculated HONO mass-flow rate was observed to be 0.18 ng min$^{-1}$ indicating that the majority of the HONO was sequestered inside the MOF and converted to N$_2$. In the presence of UiO-66, a ca. 50% decrease in HONO concentration was observed indicating that HONO can be sequestered inside the MOF but not as efficiently as in UiO-66-NH$_2$.

Example 5: Real-Time NO$_x$ and HONO Detection Using Chemiluminescence

Figure 5:
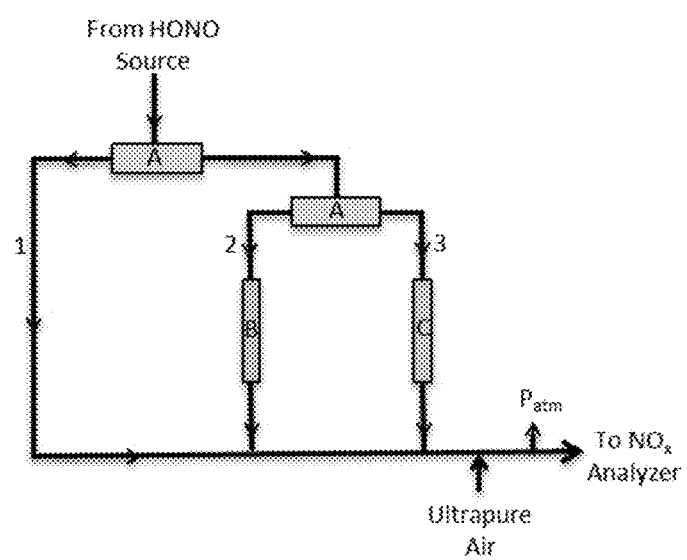
FIG. 5 is a schematic representation for equipment for HONO breakthrough experiments.

Time-resolved breakthrough experiments were performed using the American Ecotech *Serinus* 44 Ammonia & Oxides of Nitrogen Analyser operating at 0.1 Hz and averaging to 1 minute measurements. The instrument measures the nitrogen oxides NO, and NO$_x$ (=NO+NO$_2$) by using one chemiluminescent NO detector and two channels, the one for NO$_x$ with a heated Mo catalyst, to determine their mixing ratios. The general detection principle of the instrument involves reacting NO with ozone (O$_3$) to generate excited state NO$_2$*. During chemiluminescent relaxation, a photon is released and detected by a photomultiplier.[4] The detection limit of the *Serinus* 44 analyzer provided by the manufacturer is 0.4 ppbv with a range of 0-20 ppmv. Using this technique, NO can be measured by reaction with O$_3$. Other nitrogen oxides must first be converted to NO before they can be measured. The mechanisms for NO$_2$ and HONO analysis are synonymous and involve converting either into NO using the Mo catalyst heated to 325° C. in the NO$_x$ channel. Thus, NO$_2$ is determined by difference between the NO$_x$ and NO channels. In the real atmosphere, NO$_2$ is often present at an order of magnitude higher mixing ratio, so the known interference of HONO is often overlooked. However, this interference can also be exploited to measure HONO, which is well documented.[5] By utilizing a Na$_2$CO$_3$ denuder to scrub HONO from an experimental flow (e.g., flow 3, FIG. 5), it can be quantified by difference from any NO$_2$ in the same flow. As shown in FIG. 5, HONO output of the permeation source is directed through three different channels using (A) 3-way PTFE solenoid valves and diluted with ultrapure air before being sampled by the NO$_x$ analyzer. Diluted sample flows are provided in excess and vented to waste at atmospheric pressure (P$_{atm}$) to prevent intrusion of room air in to experimental samples. To scrub HONO quantitatively from a sample flow, it is passed through (B) a Na$_2$CO$_3$-coated annular denuder. To determine the breakthrough of HONO in a particular MOF the HONO flow is directed through (C) a 10 mg sample held in place with plugs of glass wool.

Experimental samples were introduced into the instrument from the HONO source in a 2000 sccm flow of ultrapure air generated by an American Ecotech GasCal 1100 coupled to an 8301 Series Compressed Air Source. This provided HONO mixing ratios (8-15 ppbv) within the calibrated and linear response range of the instrument. Using two 3-way solenoid valves (PTFE, 24 V), samples could be sent directly to the instrument as a positive control for HONO, passed through a $Na_2CO_3$-coated annular denuder (URG Corp, Chapel Hill, N.C.) as a negative control for HONO, or through a MOF packing as described above to assess breakthrough (FIG. 4).

The annular denuder prepared with a carbonate coating acted as a quantitative sink for HONO,[5-7] providing a means of quantifying and subtracting trace amounts of NO and $NO_2$ from the HONO source output and quantifying HONO itself. The HONO source output was therefore modulated through the three channels of the solenoid valve system to assess breakthrough of a variety of MOFs and control substrates. Total system flows were quantified from the HONO source and at the exit of each flow path in the breakthrough system to ensure no gas leaks were present in the experimental setup. Background $NO_x$ signal in ultrapure air was monitored before and after experiments to ensure proper flows were being provided to the instrument and that no leaks were present (n=1655, NO=0.01, $NO_2$=0.17, and $NO_x$=0.18 ppbv; LOD=0.4 ppbv). Background signals were used to correct experimental data. The HONO source output was monitored for several hours prior to and after breakthrough experiments to ensure it was stable (e.g., n=4975, RSD=7.6%) and to quantify the emission rate over the course of the tested breakthrough (e.g., 8.9±0.7 ppbv, 1σ). Quantification of $NO_x$ impurities in the HONO source were assessed by passing the flow through the annular denuder and used to correct the HONO measurements by difference (e.g., n=305, RSD=60%, 1.3±0.8 ppbv). Correction for these backgrounds and impurities are responsible for the majority of the uncertainty in the HONO measurement.

Figure 6:
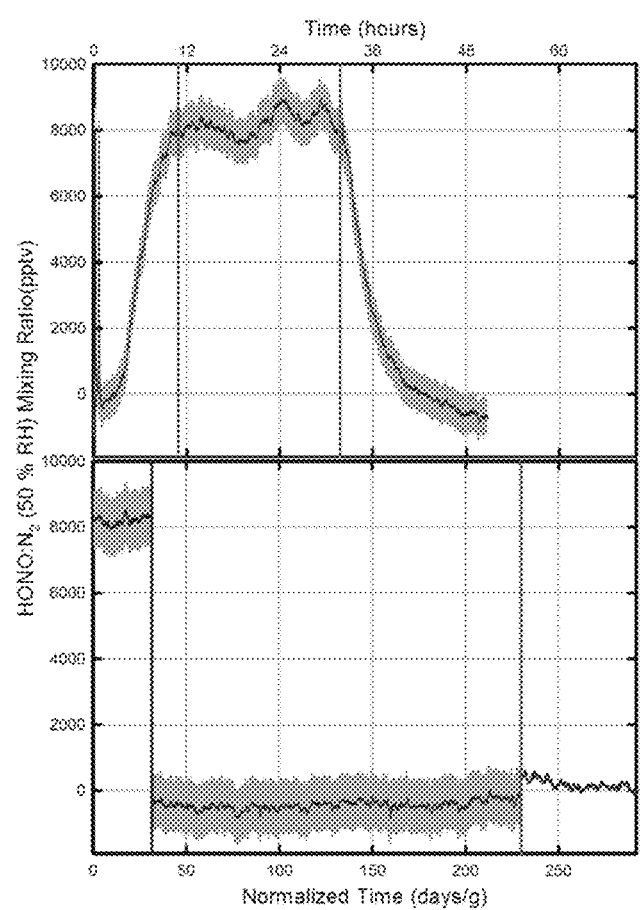
FIG. 6 are breakthrough curves for metal organic frameworks of the disclosure exposed to HONO.

Breakthrough experiments were performed on glass wool plugs as a control to account for sorption and desorption attributed to the presence of this material. Breakthrough of HONO in the presence of MOFs was assessed by continuous monitoring of HONO in the presence of 10 mg samples of UiO-66, UiO-66-$NH_2$, and $Zn_2$(BDC-$NH_2$)$_2$(DABCO). Physisorption of HONO to the glass wool (5.2±0.2×10$^5$ pptv·min) accounted for 10%, <<1%, and 1% of the experimental observations for these MOFs, respectively, took place on the same order of physisorption observed in the experiments (i.e. hours) and was a reversible process (e.g. sorption: 3.2±3.5×10$^5$ pptv·min, desorption: 5.2±0.2×10$^5$ pptv·min). If steady increase in HONO signal was observed over several hours of MOF exposure, the experiment was allowed to continue until quantitative breakthrough was observed. The HONO source was then shut off and the MOF purged with an identical flow of $N_2$ at 50% relative humidity and HONO monitored until emissions reached levels near those observed for ultrapure air. Sorbed and desorbed HONO were then quantified relative to the HONO source output to determine whether the process was reversible and, if reactive, the extent of loss. If HONO did not increase steadily, then the experiment was run until several breakthrough quantities for other MOFs were surpassed, followed by turning the HONO source off and purging with $N_2$, as described above. As shown in FIG. 6, breakthrough curves for UiO-66 (top) showing that HONO eventually passes through the MOF. Breakthrough curves for UiO-66-$NH_2$ (bottom) in FIG. 6 showing that under identical conditions, UiO-66-$NH_2$ doesn't break through even after 5 breakthrough times for UiO-66.

While the present disclosure has been described with reference to what are presently considered to be the preferred examples, it is to be understood that the disclosure is not limited to the disclosed examples. To the contrary, the disclosure is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

FULL CITATIONS FOR DOCUMENTS REFERRED TO IN THE DESCRIPTION

1 Katz, M. J. et al. A facile synthesis of UiO-66, UiO-67 and their derivatives. *Chem. Commun.* 49, 9449-9451, doi: 10.1039/c3cc46105j (2013).
2 MacInnis, J. J., VandenBoer, T. C. & Young, C. J. Development of a gas phase source for perfluoroalkyl acids to examine atmospheric sampling methods. *Analyst*, 10.1039/C1036AN00313C (2016).
3 Febo, A., Perrino, C., Gherardi, M. & Sparapani, R. Evaluation of a High-Purity and High-Stability Continuous Generation System for Nitrous Acid. *Environ. Sci. Technol.* 29, 2390-2395, doi:10.1021/es00009a035 (1995).
4 *Serinus* 44 Ammonia & Oxides of Nitrogen Analyser User Manual Version 3.0. *Ecotech Serinus 44 Ammonia & Oxides of Nitrogen Analyser User Manual Version* 3.0.
5 Han, C., Yang, W., Wu, Q., Yang, H. & Xue, X. Heterogeneous Photochemical Conversion of NO2 to HONO on the Humic Acid Surface under Simulated Sunlight. *Environ. Sci. Technol.* 50, 5017-5023, doi:10.1021/acs.est.5b05101 (2016).
6 VandenBoer, T. C. et al. Nocturnal loss and daytime source of nitrous acid through reactive uptake and displacement. *Nature Geosci* 8, 55-60, doi:10.1038/ngeo2298 http://www.nature.com/ngeo/journal/v8/n1/abs/ngeo2298.html#supplementary-information (2015).
7 VandenBoer, T. C. et al. Understanding the role of the ground surface in HONO vertical structure: High resolution vertical profiles during NACHTT-11. *J. Geophys. Res.: Atmos.* 118, 10,155-110,171, 10.1002/jgrd.50721 (2013).

The invention claimed is:
1. A method for the sequestration of HONO, the method comprising:
  (i) providing a metal organic framework (MOF);
  (ii) contacting the MOF with a HONO-containing stream wherein the MOF sequesters HONO,
  wherein the MOF is an amine-functionalized MOF, and wherein the MOF reacts with HONO to form nitrosonium ion ($NO^+$), and further converts $NO^+$ to nitrogen gas ($N_2$) in the presence of water.
2. The method of claim 1, wherein the HONO is gaseous HONO.
3. The method of claim 1, wherein the amine-functionalized metal organic framework comprises at least one amine group having the formula —NR'R", wherein where R' and R" are independently or simultaneously H, ($C_1C_{20}$)-alkyl or ($C_6$-$C_{20}$)-aryl.

4. The method of claim 3, wherein R' and R" are independently or simultaneously H, $(C_1$-$C_{10})$-alkyl or phenyl.

5. The method of claim 4, wherein R' and R" are H.

6. The method of claim 1, wherein the metal organic framework comprises
   a) a plurality of metal nodes; and
   b) a plurality of multidentate linking ligands that connect adjacent metal nodes.

7. The method of claim 6, wherein the metal node comprises a group of the formula $M_w(O)_x(OH)_y$, where M is any suitable metal, w is 6, x is 4, and y is 4.

8. The method of claim 7, wherein M is titanium, hafnium, zirconium or aluminum.

9. The method of claim 7, wherein the metal node is $Zr_6O_4(OH)_4$.

10. The method of claim 9, wherein the $Zr_6O_4(OH)_4$ is formed in situ from hydrolysis of $ZrCl_4$.

11. The method of claim 6, wherein the multidentate linking ligand is 1,4-benzenedicarboxylate or biphenyl-4,4'-dicarboxylate.

12. The method of claim 6, wherein the multidentate linking ligand is functionalized with at least one amino group having the formula NR'R", wherein where R' and R" are independently or simultaneously H, $(C_1$-$C_{20})$-alkyl or $(C_6$-$C_{10})$-aryl.

13. The method of claim 12, wherein the amino group is $NH_2$.

14. The method of claim 1, wherein the metal-organic framework is UiO-66-$NH_2$.

\* \* \* \* \*